3,248,206
GLASS CONTAINING POT FURNACE
John M. Apple, Henrietta, and Theodore J. Zak, Irondequoit, N.Y., assignors to Bausch & Lomb Incorporated, Rochester, N.Y., a corporation of New York
Filed July 2, 1962, Ser. No. 206,788
6 Claims. (Cl. 65—347)

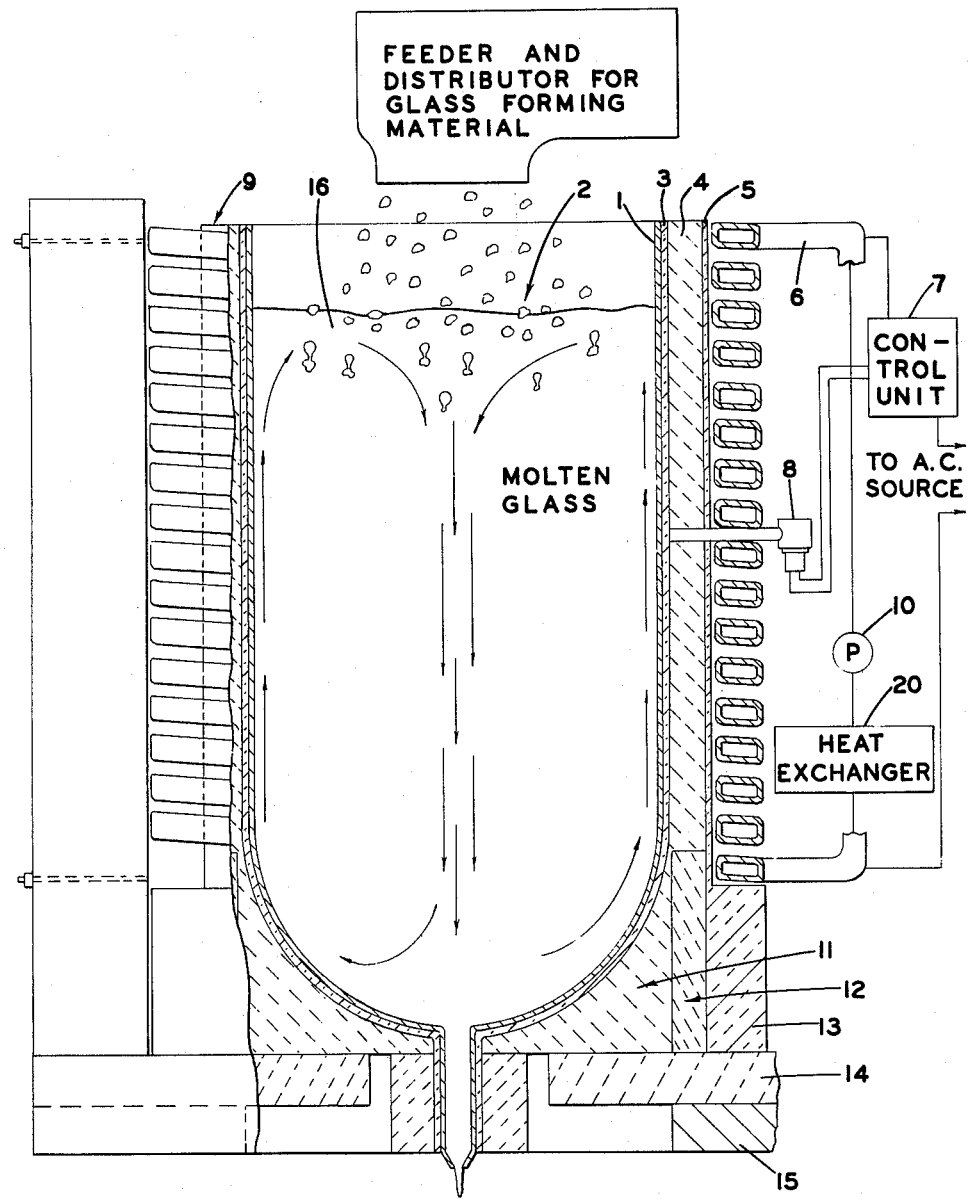

This invention relates to a glass furnace and more particularly to a glass containing pot suitable for melting glass.

The reduction in physical size of a glass furnace has certain inherent advantages which will reduce the change-over time and also the initial running time prior to delivery of quality glass suitable for a salable ophthalmic lens. The reduction in size of melting pot however creates a greater exposed surface for unit volume of the melting pot. The greater exposed area for unit volume accordingly causes a faster rate of cooling for the molten glass in the melting pot. This requires a more efficient heating arrangement for melting of the glass and also a more efficient insulating structure to retain heat directed into a melting pot. The greater heating may be achieved through a closer coupling of an induction coil to the metal liner and the molten glass in a melting chamber. With a closer coupling and reduction in thickness of insulation a substantially greater insulating efficiency is required to achieve these results. Accordingly this invention provides greater overall insulating efficiency combined with an improved heating arrangement.

It is an object of this invention to provide greater insulating efficiency and improved heating means associated with a glass melting chamber.

It is another object of this invention to provide a melting pot having a substantially thinner metallic liner and thinner insulating material forming the pot structure permitting closer coupling of inductor and susceptor.

It is a further object of this invention to provide a thinner metallic liner and a refractory material combined with an infrared radiation reflecting medium intermediate a molten glass containing chamber and an induction heating coil arrangement.

It is a further object of this invention to provide a metallic liner and a refractory material combined with a radiant energy reflecting material to retain heat within a melting chamber of an induction heating melting pot, providing high rate of energy transfer into the chamber and substantial reduction in physical size of the melting pot as compared to conventional continuous glass melting furnaces.

It is a further object of this invention to provide a method of simultaneously melting and fining of glass.

The objects of this invention are accomplished by constructing a pot for containing molten glass of a thin platinum liner coated with an aluminum oxide providing sufficient strength for supporting and retaining the platinum. The aluminum oxide replaces a portion of the conventional platinum liner which is expensive and has structural weaknesses when operated under high temperature. A suitable refractory material contains the platinum liner and aluminum oxide coating to give added structural strength and permit a close coupling of an induction coil which operates to produce eddy currents in the platinum liner and the peripheral portion of the molten glass received within the platinum liner. An additional feature is to position a thin wall of potassium titanate intermediate the refractory material and the induction coil. Potassium titanate operates as an efficient reflector of infrared radiant energy and redirects infrared radiation back into the melting chamber of the pot. The induction coils are constructed of a hollow tubular water conducting coil to permit cooling of the coils. The structure as described provides a close coupling of the platinum to the induction coils. The pot structure has an efficient insulating characteristic which retains a high percentage of heat within the pot. The high overall efficiency of the system of the combined heating and insulating permits a substantial reduction of the physical size of the melting chamber.

A pot structure in accordance with these specifications permits a substantial reduction in size of a glass furnace and also reduces the change-over time and the amount of glass initially run prior to production of ophthalmic lenses.

Associated with the melting chamber of this type a feeder arrangement is illustrated to provide a predetermined rate of feed in accordance with a predetermined rate of flow of glass through the furnace. The suitable distribution means evenly distributes the glass forming material on a surface of molten glass and a melting chamber. The melting chamber temperature is accurately controlled to maintain a continuous melting in accordance with the feed rate preventing a partially melted material from passing from the melting chamber prior to melting. Degassing in the furnace is also accomplished simultaneously with the melting. The degassing is accomplished simultaneously with the melting before any of the glass forming material which is deposited on the surface of the molten glass means penetrates any appreciable distance below the surface.

The principle of formation of bubbles requires that a discontinuity within the fluid body be present to permit the formation of a bubble. A surface tension in the fluid mass is so great that a bubble cannot form unless a nucleus is present within the liquid. This nucleus sufficiently reduces the surface tension permitting the initial formation of a minute bubble. The glass forming material distributing on the surface of the molten glass provides the necessary break in the mass of fluid for the formation of a bubble. Once the bubble is formed is can rapidly expand in size and rise upwardly until it pierces the surface and is released.

A sufficient high temperature and low viscosity of the molten glass permits the bubble to expand rapidly and rise to the surface. A rapid melting of the flux and dissolving of the glass forming oxides cause the bubble to grow rapidly in size as the gases formed from the melting of the glass forming material. The bubble is released from the particle of glass forming material upon complete dissolution of the material and due to the differential in pressure acting on the bubble. The pellet of glass forming material provides two functions which are breaking of the surface tension to permit bubble formation and releasing the bubble to allow to rise upwardly as the pellet is completely dissolved. The controlled melting in accordance with the rate of feed permits a continuous flow of glass through the furnace at a predetermined rate and a degassing of the molten glass during the process of melting.

The preferred embodiment of the invention will become apparent to those skilled in the art from the following detailed description taken in conjunction with the drawing.

The drawing illustrates the pot structure which provides an insulating medium intermediate the melting chamber and the heating coil.

The pot structure as illustrated is formed of a platinum liner which is relatively substantially thinner than liners used in conventional furnaces. Platinum has certain structural weaknesses which must be compensated for when operating under high temperatures. The thickness of the platinum liner may be further reduced by coating the outer surface of the liner with an aluminum oxide which increases the structural qualities and reduces the quantity of platinum needed. Platinum has a characteristic known as migration when operated under high temperatures which causes a deterioration of the platinum liner which may be eliminated by the dense aluminum oxide coating in intimate contact with the liner.

The platinum and aluminum oxide is then positioned in an induction coil which receives a potassium titanate layer which operates as a reflecting medium. The space intermediate the potassium titanate is then filled with a castable alundum to give support to the pot structure and maintain concentricity. It is not imperative that Alundum be used as a suitable refractory having the similar characteristic might serve the purpose as well. The Alundum wall is substantially thinner than previously used to facilitate a close coupling between the heating coil and the melting chamber. The induction coil is formed of a hollow current conducting metal. The coil is hollow to permit the circulation of water through the coil to prevent overheating.

Referring to the drawings the pot structure is illustrated partially in cross section to more clearly show the position of the various parts relative to each other. The metallic liner 1 contacts molten glass received within the melting chamber 2. Platinum is generally used as the metal contacting the molten glass however rhodium or such metals might be used providing their characteristics are similar to platinum. A liner thickness of approximately .020" is considered adequate in the pot.

The liner is formed initially and then coated on its outer portion with aluminum oxide 3. The aluminum oxide greatly strengthens the platinum liner because it is capable of withstanding high heat and retains the platinum in its zone as initially cast. The aluminum oxide coating is a non porous coating which prevents migration of the platinum, acts as a supporting structure, and partly as a reflector, although a certain amount of radiation is created due to the high operating temperatures in a melting chamber. The wall of Alundum 4 surrounds the aluminum oxide coating 3 to form a positioning and a supporting structure for the platinum liner 1 and the oxide coating 3. The alundum wall 4 is castable and is also porous to contain air which also operates as an insulating means. The Alundum wall produces a temperature gradient from the aluminum oxide layer 3 to the layer 5 which is formed of a composition such as potassium titanate. The potassium titanate is a very efficient reflecting medium reflecting the major portion of infrared radiation and which forms a layer on the outer periphery of the alundum. The temperature of potassium titanate is substantially lower than the aluminum oxide coating and reflects heat radiation back into the melting chamber.

A hollow induction coil 6 is coiled concentrically around the potassium titanate layer 5 which provides the heating element for heating the molten glass in the melting chamber 2. The coil 6 is electrically connected through the control unit 7 to the source of alternating current as indicated. The control unit 7 operates in response to the heat sensing element 8 positioned on the lateral surface of the pot 9. A certain degree of heating is created on the coil 6 due to the flow of electrical current through the coil and also a certain amount of heat escapes from the pot 9. The temperature of the coil is maintained quite low through the circulation of water through the coil by the pump 10 circulating water through the heat exchanger 20. It is not necessary that a pump and heat exchanger be used if an adequate supply of cool water under pressure is available which may be utilized for cooling of the coil.

A supporting structure is also illustrated which includes an alundum base 11 surrounded by potassium titanate 13, a zirconium sleeve 12 received within a potassium titanate cylinder 13. The pot is supported on a transite base 14 which is formed of a mixture of Portland cement and asbestos. This plate in turn is supported on a metallic base 15 of any suitable metal such as aluminum.

The glass containing pot as illustrated is intended to operate as a means for retaining molten glass. The pot adapts itself readily for a glass melting pot although the inventor does not wish to limit the invention specifically to this use. The preferred form would include a platinum liner 1 of approximately .020" surrounded by a coating of aluminum oxide 3 which would also be approximately .020" thick. The liner 1 and the coating 3 form a sufficiently strong structure to maintain its shape under normal conditions but does however require added supporting means such as the Alundum wall 4 which is approximately ½" thick. The Alundum wall 4 is received within a potassium titanate layer 5 which operates as a reflector. Potassium titanate is structurally weak and may require a thickness of from .030" to .040" thickness to maintain its shape.

The induction coil 6 surrounds the potassium titanate layer to form the heating element to heat molten glass contained within the chamber 2 within the pot 9. The total thickness of the pot wall intermediate the induction coil 6 and the chamber 2 has been substantially reduced to provide a close coupling between the coil and molten glass in the chamber 2. The magnetic lines of force generated by alternating current applied to the coil induce eddy currents in the platinum liner 1 and the peripheral portion of the molten glass 16 in the pot 9. Due to the close coupling the platinum liner is saturated with the flux causing the inner periphery of the pot also to receive magnetic line of force which operate in the molten glass. The flux in the platinum liner and the molten glass create eddy currents which agitate and heat the molten glass creating convection currents in the body of molten glass. Sufficient heat is generated to provide an operating temperature desired which may be approximately 2300° to 2600° depending on the chemical composition of the raw batch being melted. The temperature is controlled through the heating sensing element 8 which is directly connected to the unit 7 which in turn regulates the flow of electrical energy from the A.C. source to the induction coil 6.

The induction heating maintains a heating of the molten glass which is controlled in response to the heat sensing element 8 providing a rapid and uniform heating of the pellets distributed on the surface of the molten glass preventing any agglomeration of pellets from sinking into the glass causing partially melted raw batch to be discharged from the melting pot. The heat of molten glass rapidly dissolves the flux and causes melting of the glass forming oxides in the glass forming material. The bubbles are formed on the particles of glass forming material which rapidly enlarge as the size of the pellet is reduced due to melting upon complete dissolving and melting of the pellet the gas is allowed to rise and be released from the surface of molten glass. Heating of the peripheral walls of the melting pot causes a convection current upwardly on the outer periphery of the molten glass and to flow downwardly in the center of the molten glass. The convection current serves to equalize temperatures throughout the mass of molten glass. The rate of flow is relatively slow so as not to cause unmelted material to descend any appreciable distance from the surface of the glass. The rate of molten glass is sufficiently slow to permit the upward movement of gas bubbles which is greater than the movement of the convection current in the center of the pot. The rate of flow is determined from the dimensions of the pot and the temperature and viscosity of molten glass.

To maintain cool operating conditions of the coil 6 a fluid circulating medium is circulated by the pump 10 through the heat exchanger 20 and through the coil 6.

The heat generated in the platinum 1 and the molten glass 16 by the induced eddy currents raises the temperature of the platinum 1 and the aluminum oxide 3 to such an extent that the platinum liner and the oxide coating 3 as well as the molten glass 16 operate as radiating sources. The Alundum layer 4 reduces the temperature as the distance from the molten glass 16 increases. The Alundum radiates considerably less infrared radiation than the aluminum oxide and platinum. A potassium titanate layer 5 operates as a reflector of radiant energy passing through the alundum layer 4. Nearly all of the infrared radiation is reflected back into the chamber 2. The reflecting layer 5 greatly reduces the loss of radiant energy and thus confines the heat to the structures within. In this manner a physical thickness of the pot walls is substantially reduced in contrast to conventional standards and yet the insulating efficiency is greatly increased. This has permitted a substantial reduction in the physical size of the molten glass containing pot. By substantially reducing the wall thickness of the pot the transfer of energy from the induction coil to the molten glass is more efficient. The overall heating efficiency is accordingly increased.

The melting pot as illustrated makes a small glass melting pot feasible where in the past this type operation has been impractical. Economic advantage of such a device is readily apparent as the delay time in change-over, waste due to unused glass, low operating costs, and running time required prior to delivering a salable quality glass usable for ophthalmic lenses is improved.

It is apparent that within the scope of the invention, modifications might be made other than disclosed herein and that the present disclosure is not limitive but illustrative only. The following attached claims set forth the invention as illustrated and described.

We claim:

1. A melting pot structure adapted for melting glass comprising, a platinum metallic liner, an aluminum oxide coating of approximately of the same thickness of said metallic liner binding the outer surface of said liner preventing any shifting of the liner under high temperatures, an alundum refractory receiving said liner and said aluminum oxide coating to provide structural support for said elements, a potassium titanate layer operating as a reflector to reflect radiant energy from said pot back into said pot to conserve energy in the system, an induction coil surrounding said layer having energizing means producing eddy currents and agitation in said metallic liner and the molten glass for melting of said glass.

2. A melting pot structure adapted for melting glass comprising, a platinum liner of approximately .020" thickness for receiving a body of molten glass, an aluminum oxide coating of approximately .020" thickness bonded to the outer surface of said platinum liner, an alundum refractory enclosing the aluminum oxide coating to provide structural support for said melting pot, a potassium titanate reflector reflecting radiant energy from the molten glass into the body of molten glass to conserve energy in the melting pot, an induction coil receiving said reflector having a source of electrical energy for energizing said coil and producing eddy currents in the metallic liner and the molten glass to heat the body of molten glass and provide the desired melting temperature of the molten glass.

3. A melting pot adapted for containing a body of molten glass comprising, a metallic liner adapted for containing the body of molten glass, a refractory supporting material enclosing said metallic liner providing a supporting means, a potassium titanate layer operating as a reflector enclosing said refractory material reflecting radiant energy from said pot back into said pot to conserve energy in the melting pot, a heating element surrounding said potassium titanate layer constructed and arranged for close coupling with the liner and molten glass which operate as the susceptor having a source energization for heating the body of molten glass.

4. In a continuous flow glass furnace comprising the combination, feeder means uniformly feeding and distributing glass forming material in accordance with a predetermined rate of flow through the glass furnace, a thin walled melting pot permitting efficient energy transfer through said wall including a metallic liner adapted for containing a body of molten glass, a refractory supporting material enclosing said metallic liner providing a supporting means, a layer enclosing said refractory material including a composition reflecting the major portion of radiant energy from the molten glass back into the melting chamber, an induction heating element surrounding said layer for heating the body of molten glass and rapidly melting the glass forming material adjacent the surface of the body of molten glass.

5. In a continuous flow glass furnace comprising the combination, means for uniformly feeding and distributing a glass forming material in accordance with the predetermined rate of flow of glass through the glass furnace, a melting pot including a metallic liner adapted for containing a body of molten glass, a refractory supporting material enclosing said metallic liner providing a supporting means, a potassium titanate layer enclosing said refractory supporting material and operating as a reflector reflecting radiant energy into the molten glass, an induction heating element surrounding said potassium titanate layer, means for energizing said heating element and automatically maintaining a temperature of the molten glass to melt the glass forming material prior to any appreciable penetration of the molten glass.

6. In a continuous flow glass furnace comprising the combination, means for feeding glass forming material at a uniform rate evenly over a prescribed area on a molten glass body, a thin walled melting pot permitting efficient energy transfer through said wall including a metallic liner adapted for containing the body of molten glass, a refractory supporting material enclosing said metallic liner providing a supporting means, a layer surrounding said refractory supporting material including a composition operating as a reflector reflecting the major portion of the radiant energy from the molten glass back into the melting pot for conserving energy in said pot, an induction heating element surrounding said infrared reflecting layer having means for energization and melting the glass forming material adjacent the surface of the body of molten glass and simultaneously providing bubble nucleus for initiating formation of bubbles which are released upon melting of said nucleus and permitted to rise to the surface producing a fining of the body of molten glass.

References Cited by the Examiner

UNITED STATES PATENTS

| | | | |
|---|---|---|---|
| 1,603,221 | 10/1926 | Thomson | 65—327 X |
| 2,212,528 | 8/1940 | Slayter | 65—346 X |
| 2,277,734 | 3/1942 | Wainer et al. | 106—55 X |
| 2,877,280 | 3/1959 | Eden | 65—136 |
| 2,947,114 | 8/1960 | Hill. | |

DONALL H. SYLVESTER, *Primary Examiner.*

A. D. KELLOGG, *Assistant Examiner.*